(12) United States Patent
Wadewitz et al.

(10) Patent No.: US 8,714,960 B2
(45) Date of Patent: May 6, 2014

(54) FIBRE CUTTING DEVICE AND METHOD

(75) Inventors: Danny N. Wadewitz, Derby (GB); Alison J. McMillan, Uttoxeter (GB); Bijoysri Khan, Ripley (GB)

(73) Assignee: Rolls-Royce PLC, London (GB)

( * ) Notice: Subject to any disclaimer, the term of this patent is extended or adjusted under 35 U.S.C. 154(b) by 252 days.

(21) Appl. No.: 13/187,147

(22) Filed: Jul. 20, 2011

(65) Prior Publication Data

US 2012/0032368 A1   Feb. 9, 2012

(30) Foreign Application Priority Data

Aug. 6, 2010  (GB) .................................. 1013226.4

(51) Int. Cl.
*B29B 7/66* (2006.01)

(52) U.S. Cl.
USPC ......................................................... 425/216

(58) Field of Classification Search
USPC ......................................................... 425/216
See application file for complete search history.

(56) References Cited

U.S. PATENT DOCUMENTS

| 3,837,383 | A | | 9/1974 | Ko |
| 5,306,133 | A | * | 4/1994 | Dayley .......................... 425/217 |
| 2002/0144767 | A1 | | 10/2002 | Johnson et al. |
| 2008/0113179 | A1 | | 5/2008 | Schreiber |

FOREIGN PATENT DOCUMENTS

| CN | 101363174 A | 2/2009 |
| DE | 3734127 A1 | 4/1989 |
| EP | 0 181 058 A1 | 5/1986 |
| FR | 2 826 986 A1 | 1/2003 |
| GB | 1 547 418 | 6/1979 |

OTHER PUBLICATIONS

British Search Report issued in British Patent Application No. 1013226.4 dated Nov. 18, 2010.
Dec. 5, 2011 European Search Report issued in European Patent Application No. EP 11 17 4682.

* cited by examiner

*Primary Examiner* — Larry Thrower
*Assistant Examiner* — Xue Liu
(74) *Attorney, Agent, or Firm* — Oliff PLC

(57) ABSTRACT

A fiber cutting device and method for cutting one or more exposed portions of a through-thickness fiber in a surface of a composite material, the device including: a cutting element for cutting the one or more exposed portions; a suction device which is operable to extract the cut exposed portions from the surface of the composite material; and a storage device for receiving the cut exposed portions.

14 Claims, 2 Drawing Sheets

FIBRE CUTTING DEVICE AND METHOD

This invention claims the benefit of UK Patent Application No. 1013226.4, filed on 6 Aug. 2010, which is hereby incorporated herein in its entirety.

The present invention relates to a fibre cutting device and method for cutting exposed portions of a through-thickness fibre in a composite material, and particularly but not exclusively to a device for cutting the loops and ends of a tuft.

A composite component may be constructed by laying up several plies of fabric to produce a fabric preform for the component. The preform is essentially a series of planar layers of fibres, having various orientations. The plies of fabric may be joined together using through-thickness fibres. For example, tufting, stitching and Z-pinning are examples of techniques for joining the plies of fabric.

FIG. 1 shows a section of a fabric preform 2. The preform 2 comprises a plurality of plies 4 which are constructed from woven or unidirectional fabric. The plies 4 are held together by individual tufts 6 and/or a row of tufts 8.

The tufts 6, 8 are created with a needle which draws a piece of fibre through the thickness of the layers of fabric, extends far enough through to leave a loop 10, and pulls back. The needle then moves along the fabric and repeats the operation. Because the thickness of the material is quite great, the tuft stays in place, but the through-thickness fibre is not locked in place as would be the case with stitching.

In the case of stitching, there are several forms, and the basic idea is that a continuous fibre is drawn repeatedly though the thickness of the fabric. The most commonly known method is equivalent to that used by a home sewing machine, where two lengths of fibre are used and they lock each other (twist over each other) at some point above, below or in the middle of the fabric. This is not ideal as the curvature put into the fibre at the point of locking can significantly weaken the fibre. This is particularly the case with high strength fibres, such as would be needed to give significant through-thickness reinforcement. For this reason, stitching is best used as a technique for making a preform more convenient to handle during manufacture processing, rather than as a technique for imparting through-thickness strength.

The stitching process can also be problematic where there is little or no access to one side of the fabric. This can be the case in a complex preform. There are techniques that use two needles, both acting from the same side, and which work together to lock the stitches together on the hidden side of the fabric. Hand sewing techniques, often with curved needles, are also possible. However hand sewing is not very practical for large quantities of sewing, and may present difficulties in ensuring repeatable quality. This is not to mention the health hazard of such close work with carbon fibres.

In the case of Z-pinning, a rigid fibre is used; this could either be a metal pin, or a piece of carbon or other fibre cured in a light coating of matrix material. The Z-pin is then pushed through the thickness of the layered fabric and held in place by friction. There are several methods for pushing the pin into the fabric; ideally it is necessary to push a whole domain of pins into the material all at once, to reduce distortion of the fabric, and also to reduce processing time of what could be a long and fiddly process. This can be done by pushing the pins into a piece of foam material so that they are all correctly aligned. The foam material is then laid over the layered fabric, and a press pushes down onto the foam. As the foam compresses, the pins are forced into the layered fabric to form the through-thickness reinforcement.

With each of the above described techniques, the through-thickness fibres are present in the surface of the material. For example, with tufting the loop 10 at the bottom of the tuft, the free ends 12 of the tuft and/or the thread 14 crossing to the next tuft are present in the preform 2 Without further steps prior to moulding this can lead to an unsightly or poor quality surface finish. This is particularly an issue in the aerospace industry where such composite materials may be used in fan blades or other components having an aerofoil profile. Any such deviations in the surface finish reduce the efficiency of the aerofoils. To overcome this problem, an outer layer of resin may be laid over the material so as to cover the ends and loops of the tufts. However, this adds weight to the component. The surface of the component may also be slightly bumpy as a result of residual stress recovery after moulding. This could be machined off after moulding, but this increases the cost and lead time of the component.

The present invention seeks to provide a device which alleviates the above identified problems.

According to a first aspect of the invention there is provided a method of using a fibre cutting device to cut one or more exposed portions of a through-thickness fibre in a surface of a composite material, the device comprising a cutting element for cutting the one or more exposed portions, a suction device which is operable to extract the cut exposed portions from the surface of the composite material and a storage device for receiving the cut exposed portions, the method comprising the steps of:

moving the fibre cutting device over the surface of the composite material so the cutting element cuts the one or more exposed portions; and extracting the cut exposed portions from the surface of the composite material to the storage device using the suction device.

The removal of the exposed portions of the through-thickness fibres improves the surface finish of the material.

This can be particularly important where the material is used to form an aerodynamic component such as an aerofoil.

Optionally, the step of moving the fibre cutting device over the surface of the composite material so as to cut the one or more exposed portions comprises the additional initial step of:

setting the separation of the cutting element from the surface of the composite material.

In an embodiment of the invention, the separation of the cutting element from the surface of the material is such that the through-thickness fibres are trimmed flush with the surface of the material.

In another embodiment of the invention, the separation may be adjusted so as to leave the through-thickness fibres extending from the surface of the material by a predetermined distance.

Optionally, the composite material comprises a fibre reinforced composite material with the reinforcing fibres being selected from the group comprising glass fibres, carbon fibres or aramid fibres.

The selection of the type of fibre used for the fabric preform is generally made on the basis of the service requirements for the finished component. For example, glass fibres may be used for general components, for which low cost is the most important requirement.

Alternatively, parts requiring a high strength to weight ratio, may employ carbon fibres, while parts which must be capable of withstanding impact events may utilise aramid fibres.

According to a second aspect of the invention there is provided a fibre cutting device for cutting one or more exposed portions of a through-thickness fibre in a surface of a composite material, the device comprising: a cutting element for cutting the one or more exposed portions, and a suction device which is operable to extract the cut exposed portions from the surface of the composite material There may be a control device for setting the separation between the cutting element and the surface of the composite material.

The control device may blow air against the surface of the composite material so as to move the cutting element to a predetermined distance from the surface.

The use of an air stream to create a force to move the cutting element relative to the surface of the material requires minimal contact between the fibre cutting device and the surface. This minimises the possibility of damaging the surface during the fibre cutting process, which improves the quality of the finished components.

The control device may blow the air at a rate which balances the applied force on the fibre cutting device and/or the weight of the fibre cutting device.

The fibre cutting device may further comprise a flexible seal between the fibre cutting device and the surface of the material, for reducing leakage of the air.

This reduces the volume of air which must be provided by the control device which enables the control device to be more compact. This in turn makes the cutting device more convenient for a user.

The control device may be adjustable. The air delivery rate can be continuously adjusted to ensure that the cutting element remains at the predetermined distance from the surface of the material.

The air flow rate provided by the control device may be adjusted in response to changes in the force applied to the fibre cutting device by a user.

This ensures that the separation between the cutting element and the surface of the composite material is maintained at the desired predetermined value. This makes the device easier to use.

Optionally, the composite material comprises a fibre reinforced composite material with the reinforcing fibres being selected from the group comprising glass fibres, carbon fibres or aramid fibres.

There may be a storage device for receiving the cut exposed portions.

The cutting element may comprise a blade.

The blade may be movable relative to another element so as to shear the exposed portions against the other element.

The other element may be a blade.

The cutting element may comprise two concentric barrels, each having a plurality of holes formed in a surface of the barrel for receiving the exposed portions, wherein the barrels rotate relative to one another so as to shear the exposed portions.

The barrels may comprise one or more openings formed in the surface of the barrel for allowing the cut exposed portions to be extracted by the suction device.

The barrels may be helical.

There may be a plurality of cutting elements.

In an alternative embodiment, where the fibre is a carbon fibre, the cutting device may be an electric discharge electrode which passes in close proximity to the fibre and creates an electric arc between the electrode and the fibre and which erodes the fibre.

For a better understanding of the present invention, and to show more clearly how it may be carried into effect, reference will now be made, by way of example, to the accompanying drawings, in which:

FIG. 3($b$) is a perspective view of the cutting element of FIG. 3($a$); and

Figure 1:
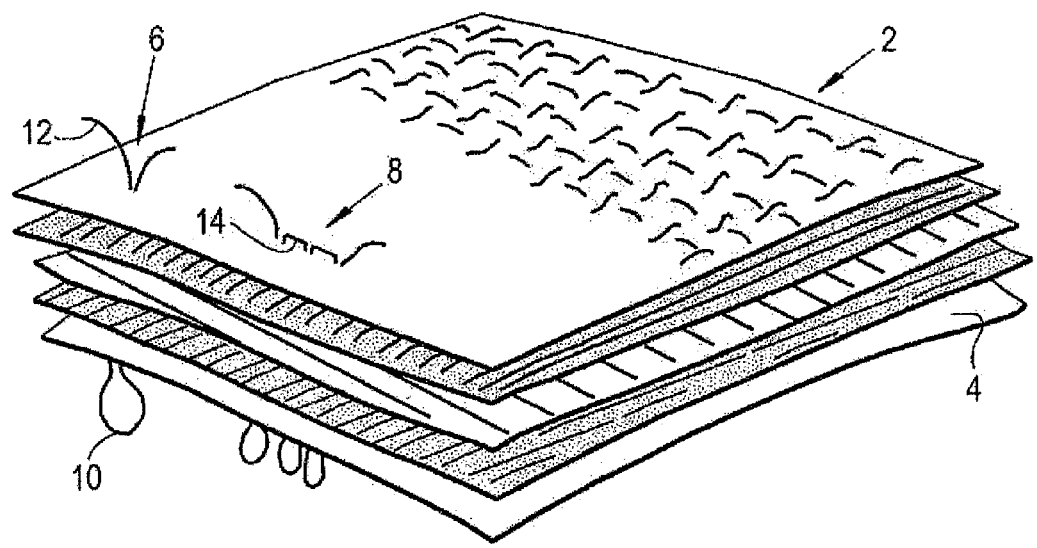
FIG. 1 is a perspective view of a section of a conventional fabric preform.
Figure 2:
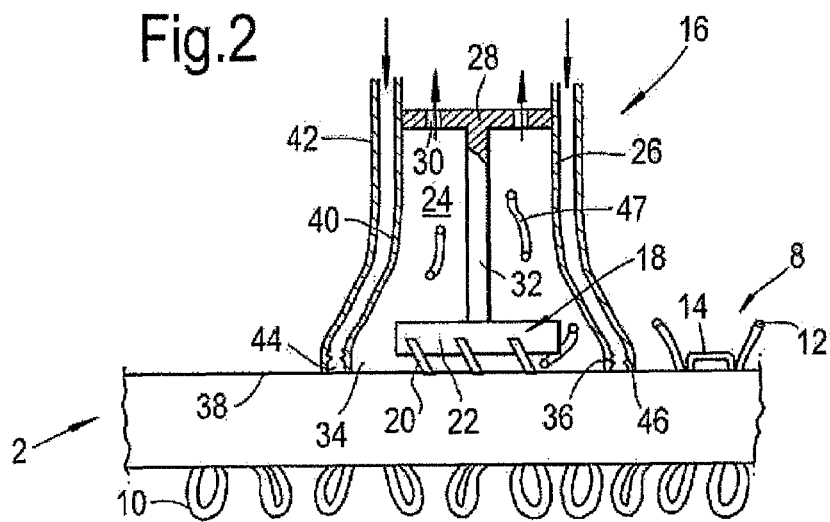
FIG. 2 is a cross-sectional view of an embodiment of a fibre cutting device according to the invention.

FIG. 2 shows a cross-sectional view of an embodiment of a fibre cutting device 16. The fibre cutting device 16 comprises a cutting element 18 having a plurality of razor blades 20 (three shown) mounted to a blade carrier 22.

The cutting element 18 is located in a central chamber 24 of the fibre cutting device 16. The central chamber 24 is defined by an inner wall 26. The central chamber comprises a partition 28 which extends in a substantially radial plane from one side of the inner wall 26 to the other and has passageways 30 formed therethrough in an axial direction. The passageways 30 provide a route in the central chamber 24 from one side of the partition 28 to the other side of the partition 28. An arm 32 extends in an axial direction from a central portion of the partition 28, to which the cutting element 18 is connected.

A suction device (not shown) provides suction in the central chamber 24. The central chamber 24 narrows from an opening 34 towards the partition 28 so as to create a venturi effect in the central chamber 24. An inner flexible seal 36 seals the opening 34 against a surface 38 of the preform 2. A storage device (not shown) is provided upstream of the partition 28.

An outer annular chamber 40 is formed between the inner wall 26 and an outer wall 42 which has a greater diameter than the inner wall 26. A control device (not shown) is provided in the outer chamber 40 and blows air from an opening 44 onto the surface 38 of the preform 2. An outer flexible seal 46 is provided which seals the opening 44 against the surface 38 of the preform 2. The inner and outer flexible seals 44,46 reduce the leakage of air from the chamber 40.

In use, the fibre cutting device 16 is positioned on the surface 38 of the preform 2. The surface 38 of the preform 2 comprises exposed portions such as the free ends 12 of the tufts and/or the threads 14 between tufts. The control device is adjusted so as to vary a flow rate of the air exiting the opening 44 of the outer chamber 40. The flow rate is controlled so as to balance the force applied to the fibre cutting device 16 (i.e. any downward pressure applied by a user, for example) and/or the weight of the fibre cutting device 16 against the upward force created by the control device. Thus, the cutting element 18 is maintained at a constant height above the surface 38 of the preform 2. This height is predetermined and may be varied depending on the desired surface finish.

The fibre cutting device 16 is moved across the surface 38 of the preform 2 so as to bring the blades 20 of the cutting element 18 into contact with the free ends 12 of the tuft and/or the threads 14 between tufts. Consequently, the blades 20 sever the exposed portions at a height above the surface 38 which is determined by the control device.

The suction device extracts the cut exposed portions 47 from the surface 38 of the preform 2. The cut exposed portions 47 are sucked up the central chamber 24 through the passageways 30 in the partition 28 and transferred to the storage device.

Although the fibre cutting device 16 has been described as removing the free ends 12 of the tuft and/or the thread 14, it could also be used to remove the loops 10 at the bottom of the tuft.

Various alternatives for the cutting element 18 could be used. For example, the blades 20 may reciprocate (for example, through vibration) to improve the quality of cut. Furthermore, the blades 20 may move toward and away from another element so as to shear the exposed portions against the other element. This other element may be another blade.

Figure 3A:
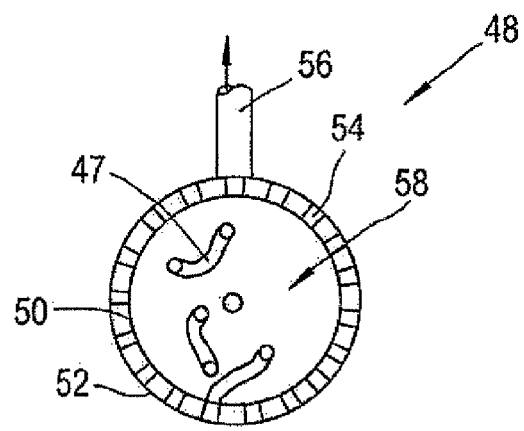
FIG. 3($a$) is a side view of an alternative cutting element for the fibre cutting device of FIG. 2.
Figure 3B:
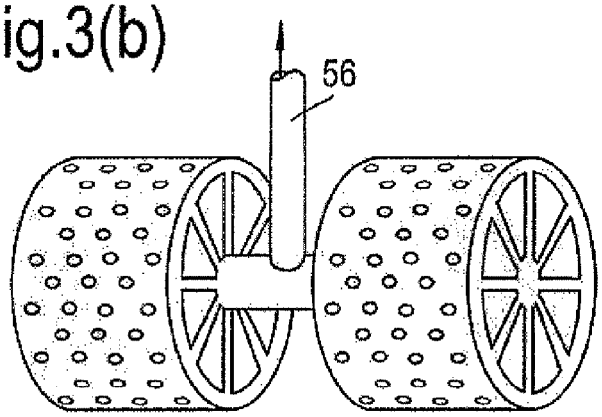

An alternative cutting element 48 for the fibre cutting device 16 is shown in FIGS. 3 (a) and (b). The cutting element 48 comprises a first barrel 50 and a second barrel 52. The second barrel 52 has a larger diameter than the first barrel 50 and the first barrel 50 is received within the second barrel 52. Both the first and second barrels 50,52 have a plurality of holes 54 which extend through the thickness of the barrel 50,52. The first and second barrels 50,52 rotate in opposite directions. As shown in FIG. 3(b), the cutting element 48 comprises a pair of first and second barrels 50,52. A pipe 56 connects the suction device to the interior 58 of the first barrels 50.

In use, the cutting element 48 is moved over the surface 38 of the preform 2. The exposed portions 47 are captured within the holes 54 when the holes 54 of the first barrel 50 are in alignment with the holes 54 of the second barrel 52. The relative motion of the first and second barrels 50,52 causes the exposed portions 47 to be severed. The cut exposed portions 47 are then extracted from the interior 58 of the first barrel 50 by the suction device via the pipe 56.

Figure 4:
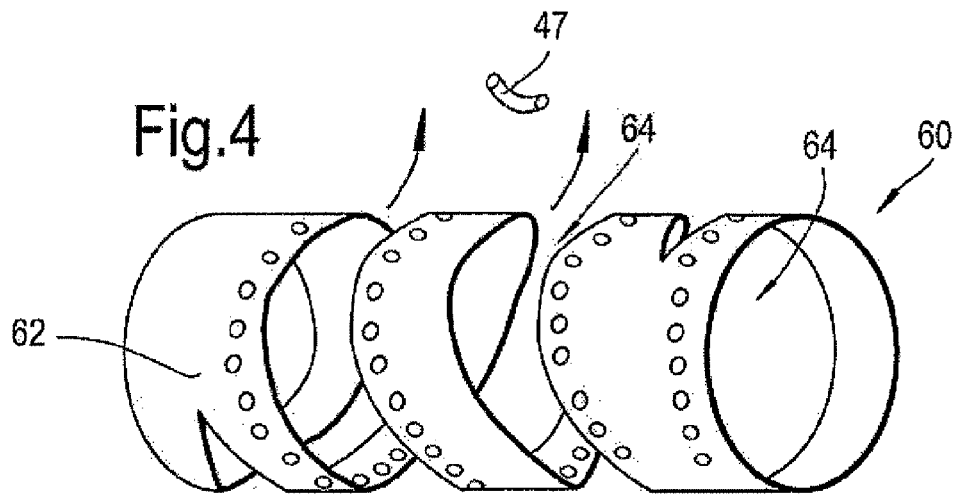
FIG. 4 is a perspective view of a further alternative cutting element for the fibre cutting device of FIG. 2.

A further alternative cutting element 60 is shown in FIG. 4. The cutting element 60 is similar to the cutting element 48 in that it has first and second contra-rotating barrels (only the second barrel 62 is shown) which sever the exposed portions 47. However, the first and second barrels 62 of the cutting element 60 each have a helical construction such that there are openings 64 formed in the surface of the barrel 62 for allowing the cut exposed portions 47 to be extracted by the suction device. Therefore, the openings 64 remove the need for the pipe 56 as used with the cutting element 48.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The aforementioned method and device have been described with particular reference to their use with glass fibre, carbon fibre, or aramid fibre reinforced composite materials. However, it is to be understood that the method and device may also be used with other types of composite material.

What is claimed is:

1. A fibre cutting device for cutting one or more exposed portions of a through-thickness fibre in a surface of a composite material, the device comprising:
A cutting element for cutting the one or more exposed portions, and a suction device which is operable to extract the cut exposed portions from the surface of the composite material, and a control device for setting a separation between the cutting element and the surface of the composite material, and wherein the control device blows air against the surface of the composite material so as to move the cutting element to a predetermined distance from the surface.

2. A fibre cutting device as claimed in claim 1, wherein the control device blows the air at a rate which balances the applied force on the fibre cutting device and/or the weight of the fibre cutting device.

3. A fibre cutting device as claimed in claim 1, further comprising a flexible seal between the fibre cutting device and the surface of the material, for reducing leakage of the air.

4. A fibre cutting device as claimed in claim 1, wherein the control device is adjustable.

5. A fibre cutting device as claimed in claim 1, wherein the composite material comprises a fibre reinforced composite material with the reinforcing fibres being selected from the group comprising glass fibres, carbon fibres or aramid fibres.

6. A fibre cutting device as claimed in claim 1, wherein comprising a storage device for receiving the cut exposed portions.

7. A fibre cutting device as claimed in claim 1, wherein the cutting element comprises a blade.

8. A fibre cutting device as claimed in claim 7, wherein the blade is movable relative to another element so as to shear the exposed portions against the other element.

9. A fibre cutting device as claimed in claim 8, wherein the other element is a blade.

10. A fibre cutting device as claimed in claim 1, wherein the cutting element comprises two concentric barrels, each having a plurality of holes formed in a surface of the barrel for receiving the exposed portions, wherein the barrels rotate relative to one another so as to shear the exposed portions.

11. A fibre cutting device as claimed in claim 10, wherein the barrels comprise one or more openings formed in the surface of the barrel to enable the cut exposed portions to be extracted by the suction device.

12. A fibre cutting device as claimed in claim 10, wherein the barrels are helical.

13. A fibre cutting device as claimed in claim 1, wherein there are a plurality of cutting elements.

14. A fibre cutting device for cutting one or more exposed portions of a through-thickness fibre in a surface of a composite material, the device comprising:
A cutting element for cutting the one or more exposed portions;
A suction device which is operable to extract the exposed portions from the surface of the composite material; and
A control device for setting a separation between the cutting element and the surface of the composite material;
Wherein the control device blows air against the surface of the composite material so as to move the cutting element to a predetermined distance from the surface.

* * * * *